(12) United States Patent
Henderson

(10) Patent No.: US 7,579,564 B2
(45) Date of Patent: Aug. 25, 2009

(54) SHEAR RESISTANT BIN LEVEL INDICATOR

(76) Inventor: Edwin Lee Henderson, 149 Madison Pl., Hattiesburg, MS (US) 39402

( * ) Notice: Subject to any disclaimer, the term of this patent is extended or adjusted under 35 U.S.C. 154(b) by 180 days.

(21) Appl. No.: 11/934,038

(22) Filed: Nov. 1, 2007

(65) Prior Publication Data

US 2008/0092802 A1    Apr. 24, 2008

Related U.S. Application Data

(63) Continuation-in-part of application No. 11/551,705, filed on Oct. 21, 2006, now abandoned.

(51) Int. Cl.
*H01H 35/00*    (2006.01)

(52) U.S. Cl. .................. 200/61.2; 200/61.21; 73/290 V; 340/621

(58) Field of Classification Search ............... 200/61.2, 200/61.21, 61.42; 73/290 V, 1 H; 340/621, 340/612–615
See application file for complete search history.

(56) References Cited

U.S. PATENT DOCUMENTS

| 2,116,075 | A | 5/1938 | Lenhart |
| 3,210,493 | A | 10/1965 | Lau |
| 3,210,495 | A | 10/1965 | Lau |
| 3,436,059 | A | 4/1969 | Donaldson |
| 3,542,982 | A | 11/1970 | Gruber |
| 3,721,971 | A | 3/1973 | Gruber |
| 4,375,020 | A | 2/1983 | Holterbosch |

OTHER PUBLICATIONS

Bindicator Installation, p. 2, col. 1, midway down, paragraph "A. On a 7" bolt circle . . . USA, Published Mar. 2003.
Monitor Bulletin 214A, p. 2, col. 1, near bottom, paragraph "Protective Baffles: (See Figure 2) . . . " USA, Published Apr. 2006.
Monitor Bulletin 534A, p. 3, col. 1, top, paragraph "Proactive Baffles: (See Figure 4) . . . " USA, Published Nov. 2004.

*Primary Examiner*—Kyung Lee

(57) ABSTRACT

A device for indicating a level of a bulk material in a bin. A motor imparts a swinging motion to a paddle located inside the bin. When the paddle engages the material, drag on the paddle causes a counteracting force on the motor, indicating a presence of material at the location of the device. In various embodiments, a paddle shaft, having very little exposure inside the bin, extends from a protective enclosure. The shaft is capped with a flexible section having the paddle attached to it. The paddle is at a downward angle relative to the paddle shaft and extends into the bin so as to engage the material. The paddle may move at an urging of the material so as to avoid damage to the paddle, flexible section, and shaft.

19 Claims, 2 Drawing Sheets

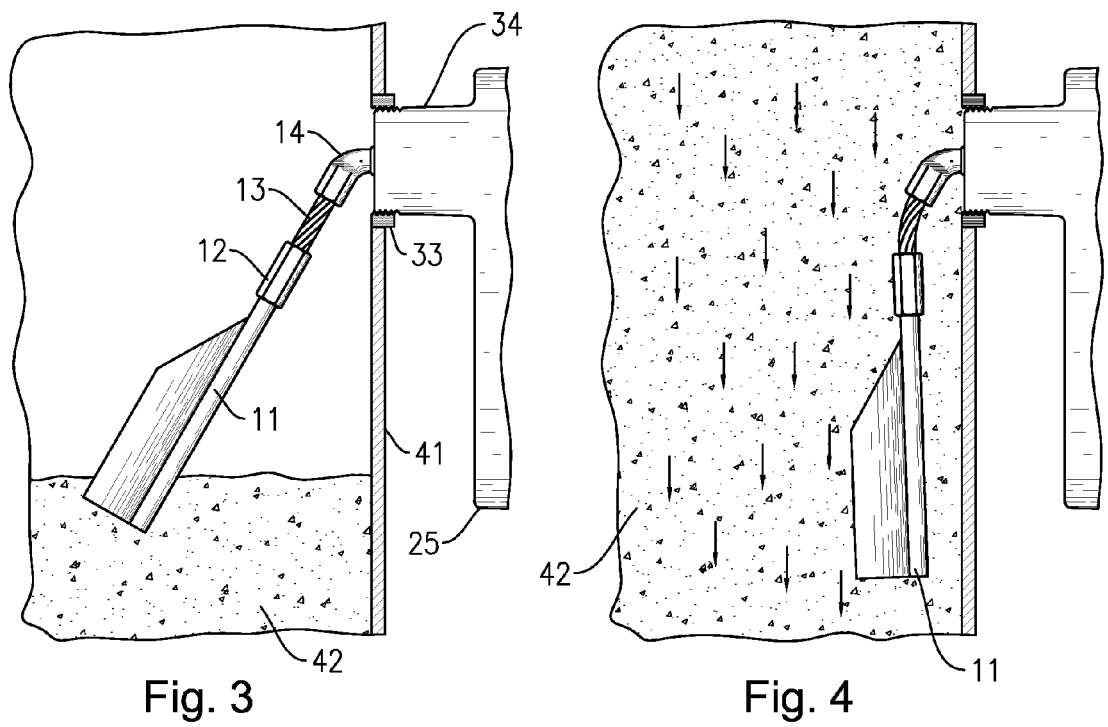
Fig. 3
Fig. 4
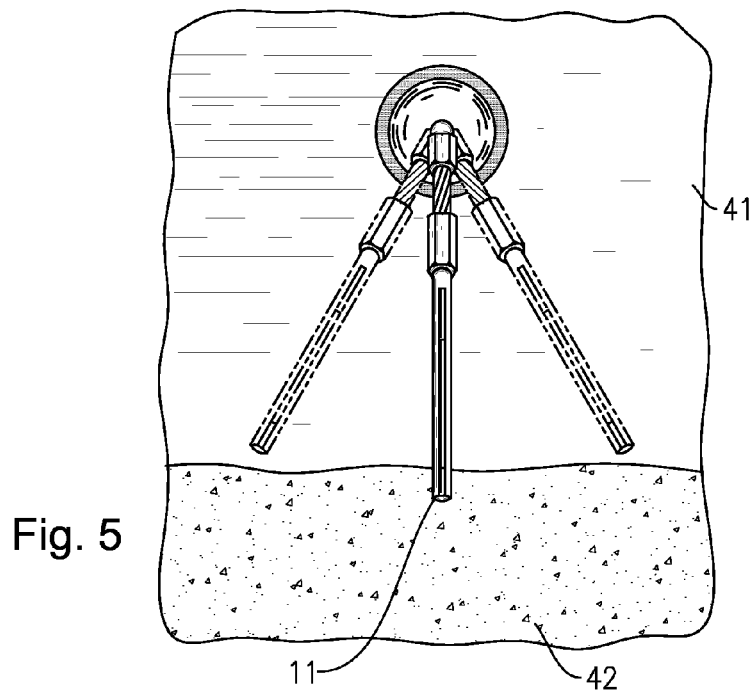
Fig. 5

SHEAR RESISTANT BIN LEVEL INDICATOR

CROSS-REFERENCE TO RELATED APPLICATIONS

This is a continuation in part of application Ser. No. 11/551,705, filed Oct. 21, 2006, now abandoned.

BACKGROUND OF THE INVENTION (1) Field of the Invention

This invention relates in general to indicators, and more particularly relates to indicators of the level of dry bulk materials within storage bins, silos, hoppers, containment structures or storage tanks.

(2) Description of the Related Art

Bin level indicators are used to sense the presence or absence of granular material within a bulk material container. The contents of these bins and containers vary greatly and may include virtually any type of bulk material from wood chips to grain to fertilizer to calcium dust. Many variations in the operating conditions of a level indicator have led to the creation of many different types of indicators with various applications and uses. The common goal of these devices is to convey an accurate indication of the level of material within a storage container. Examples of commercially available point level types are: paddle wheel or rotary, diaphragm, vibration, ultrasonic, radio frequency, and capacitance. Examples of continuous level types are: ultrasonic, plumb bob, laser, radio frequency, radar, and guided wave radar. All have their respective inefficiencies and problems.

Of the point level types, capacitance and ultrasonic types do not have to protrude into the bin, but are highly susceptible to build-up of the material. The capacitance device has a short range and can give a false signal due to voids in the material. Types such as rotary, vibration, and radio frequency have a probe or paddle which extends a significant distance into the bin and more thoroughly contacts the material.

When stored in large quantities, the bulk materials are heavy, even for relatively low density materials and thus can place great stress on level indicators which protrude significantly inside the storage container and are located well below the level of the material. This stress can damage or destroy rotary, vibration, and radio frequency style indicators or most any indicator having a part extending into the bin. This weakness limits the placement of these indicators so as to avoid this shear force on the probe, primarily limiting them to a high level indication. Typically the indicator may not be placed in a low position in the bin without a protective hood installed inside the bin over the probe. Installation of the hood can be very difficult since this would require access to the inside of the vessel. The exact design of the hood can be difficult since the hood may interfere with the operation of the level indicator.

Another limitation on these devices is that they will not perform well if placed in the stream of the material as it enters the bin or as the material moves in a conduit such as a chute. As the material impacts the paddle or probe, it may give a false signal that the space is completely filled. The material impacting on the paddle or probe may damage the unit. This is a particular disadvantage when using these devices as plug-up indicators in chutes and pipes conveying the material. Yet another limitation is that in some cases stringy material will hang on the paddle or probe and give a false signal.

BRIEF SUMMARY OF THE INVENTION

The present invention in various embodiments addresses the above problems and shortcomings in a simple but dramatically effective way. Some of the objectives of the present invention are:

(a) to provide a bin level indicator that is immune to the shear forces produced by the weight of the material as gravity moves the material down in the bin.

(b) to provide a level indicator that will operate reliably at any location in the wall of a bin or chute.

(c) to provide a level indicator that is less sensitive to the effect of the material stream entering the bin and impinging on the paddle.

(d) to provide a level indicator with a paddle that reaches a substantial distance into the bin to fully engage the material.

(e) to provide a level indicator that is immune to material hanging on the exposed parts.

(f) to provide a level indicator that is able to accommodate various materials with a very wide range of density.

A rotary type indicator consists of a paddle which is located inside the bin. Examples of rotary type indicators are shown in the U.S. patents of Grostick U.S. Pat. No. 2,851,553 (1958) and Gruber U.S. Pat. No. 3,542,982 (1970). The paddle is attached to a shaft driven by a small electric motor in a housing located outside of the bin. The paddle turns slowly in a continuously rotating motion until it comes into contact with material in the bin. This creates a sufficient counter torque to the rotation of the motor which activates a switch that senses this torque, thereby creating a signal that material is present at that point. The present invention operates in a similar fashion, but instead of the shaft rotating in a continuous motion, the shaft operates in an oscillating motion. An example of an oscillating shaft is Holterbosch U.S. Pat. No. 4,375,020 (1983).

Various embodiments of the present invention utilize a paddle which may be comprised of a single rod or any suitable shape that will fit through the mounting hole. The paddle is attached to a paddle shaft. The paddle shaft has a relatively short exposure after leaving the housing and entering the bin. This short distance protects the paddle shaft from excessive bending forces, making it immune to shear force damage caused by the weight of the material in the bin. In various embodiments of the present invention, the paddle is connected at a point below the paddle shaft with a center line along its length that is approximately 60 degrees in relation to the paddle shaft and approximately 30 degrees in relation to the bin wall. The paddle is therefore pointed down into the container at an angle.

Between the paddle and the paddle shaft is an over-travel mechanism, which may be of any design that allows the paddle to move without damage at the urging of the bulk material. A somewhat similar over-travel mechanism can be seen in the prior art, Gruber U.S. Pat. No. 3,542,982 (1970). However, as applied in prior art, the flexible section is in line with the axis of the paddle shaft making it very vulnerable to shear damage. In a disclosed embodiment of the present invention, the flexible section is in line with the center line of the length of the paddle, and not in line with the axis of the shaft. This allows the paddle to be forced to an approximately vertical position at an angle of approximately 90 degrees in relation to the paddle shaft, as would be the case with material moving down in the bin. The paddle would then be aligned more or less parallel to the movement of the material in the bin. The material will slide past the paddle without doing any damage to the paddle, the over-travel section, or the paddle shaft. Once the material is no longer in contact with the paddle, the flexible section will allow the paddle to spring back to its normal relationship to the bin wall. In various embodiments of the present invention, this position of the paddle allows the paddle to reach out and thoroughly engage the material. If this same over-travel and paddle arrangement were applied to a common rotary indicator, the over-travel section itself would be damaged when bent at a 90 degree angle or greater by the large forces of the heavy material. The bending would be greatest when, during the 360 degree rotation of the shaft, the paddle is pointing up, at a 12 o'clock position.

In various embodiments, the paddle shaft oscillates back and forth as opposed to turning a full revolution as evidenced in the rotary style indicator. With the paddle hanging vertically downward at a 6 o'clock position as a midpoint, the paddle will move approximately 30 degrees to either side of this position. The over-travel mechanism, between the paddle and the paddle shaft, will allow the paddle to take a vertical position no matter what point of rotation the oscillating paddle shaft is in. The shaft and the paddle will therefore remain undamaged by the downward movement of the material within the container under all operating conditions.

The paddle may be made relatively long, resulting in increased leverage and in turn providing greater sensitivity to low density material. At the same time the paddle may be inserted into the bin through a relatively small opening in the side of the storage bin or container. This opportunity cannot practically be duplicated with a continuously rotating shaft. In various embodiments of the present invention, the paddle is relatively immune to stringy material hanging on the paddle. Such material will tend to slide off of the paddle.

Other objectives and advantages of the invention will become more apparent from the following detailed description when taken in conjunction with the accompanying drawings.

BRIEF DESCRIPTION OF THE DRAWINGS

FIGS. 3 and 4 are a side view of the level indicator illustrating the action of the material in the bin on the paddle.

FIG. 5 illustrates the swinging motion of the paddle as viewed from inside the bin.

DRAWING REFERENCE NUMBER LISTING

Figure 1:
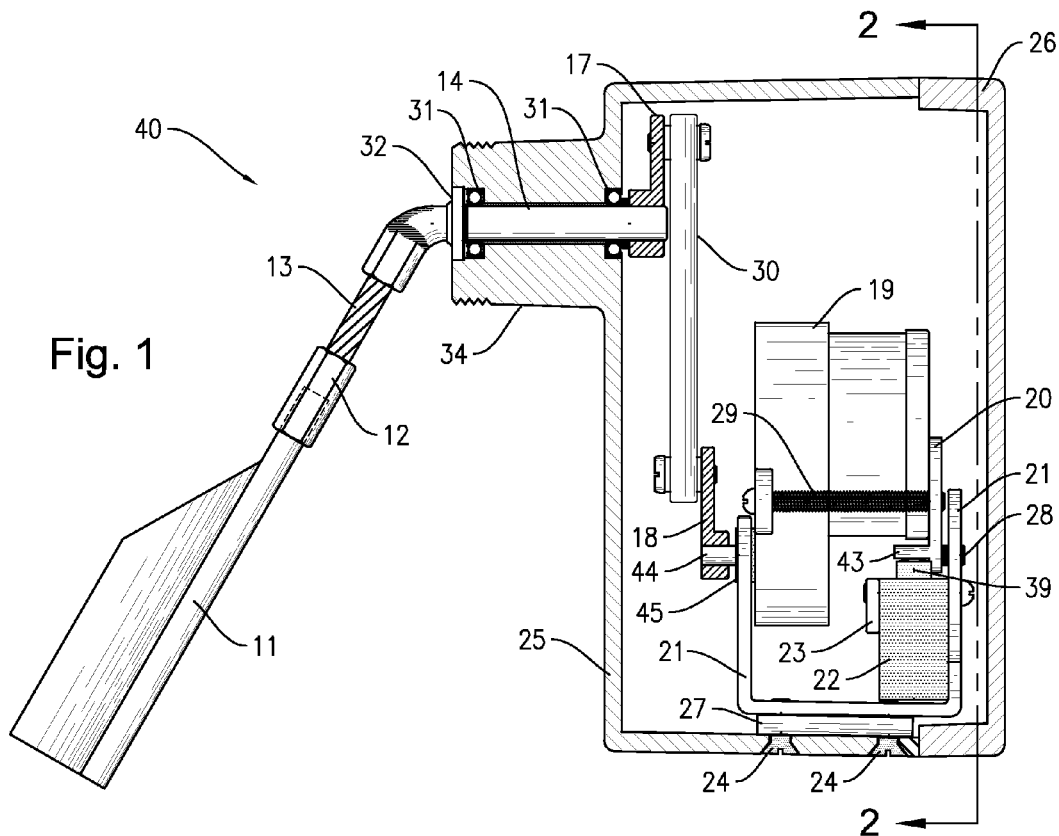
FIG. 1 is a cross section of the bin level indicator according to an embodiment of the present invention.

| 11 | Paddle |
| 12 | Flexible section fitting |
| 13 | Flexible section |
| 14 | Paddle shaft |
| 17 | Shaft rocking lever |
| 18 | Drive motor crank arm |
| 19 | Drive motor |
| 20 | Motor pivot bracket |
| 21 | Motor pivot cage |

-continued

| 22 | Snap acting switch |
| 23 | Switch backer plate |
| 24 | Cage attachment screws |
| 25 | Housing body |
| 26 | Housing cover |
| 27 | Spacer |
| 28 | Motor pivot pin |
| 29 | Pivot bracket screws |
| 30 | Crank connecting rod |
| 31 | Bearings |
| 32 | Shaft seal |
| 33 | Mounting gland |
| 34 | Mounting Stem |
| 38 | Motor pivot stop pin |
| 39 | Switch actuating button |
| 40 | Bin level indicator |
| 41 | Bin wall |
| 42 | Material in bin |
| 43 | Switch actuating arm |
| 44 | Motor output shaft |
| 45 | Round boss |
| 46 | Switch attachment screws |

DETAILED DESCRIPTION OF THE PREFERRED EMBODIMENTS

For purposes of illustration, a preferred embodiment of the present invention has been depicted as a bin level indicator 40 incorporating a hollow housing body 25 and a housing cover 26. The housing 25 includes a mounting stem 34 which engages a mounting gland 33 that is attached to a bin wall 41. Various methods such as bayonet, clamp, or set screw may be used to attach the housing to bins, silos, hoppers, chutes, or storage vessels. In FIG. 3, components within the housing 25 rotate a shaft 14 in an oscillating or rocking motion. The shaft 14 extends outside the housing 25 and attached to it, is a flexible section 13 and a flexible section fitting 12. This over-travel mechanism allows the paddle 11 to move at the urging of a bulk material 42 contained within the bin and may be constructed with various active components such as a wire rope, helical coil, or spring. Attached to the fitting 12 is a paddle 11 which is designed to contact a material 42 in the storage bin. In various embodiments, the paddle 11 is hanging down and at an angle of approximately 30 degrees to the bin wall 41. The components inside the housing move the paddle 11 in a swinging motion as is shown in FIG. 5.

Referring to FIG. 1, a motor pivot cage 21 is fastened solidly to the housing 25 by screws 24. A spacer 27 allows the cage 21 to clear the cover 26. A motor pivot bracket 20 is attached solidly to an electric rotary motor 19 by attachment screws 29. The pivot bracket 20 incorporates a motor pivot pin 28 and a switch actuating arm 43. The motor pivot pin 28 and switch actuating arm 43 are hence attached solidly to a motor 19. The pin 28 is aligned on an axis through a motor output shaft 44. A round boss 45 on the face of the motor 19 is concentric with the output shaft 44. This boss 45 provides a pivot center on one side of the motor 19. The pin 28 which is along the same center line provides a pivot center on the back of the motor 19. The boss 45 is located within a hole on one side of the pivot cage 21. The pivot pin 28 is located within a hole on the opposite side of the pivot cage 21. The motor 19 can rotate or pivot with respect to the housing 25.

Figure 2A:
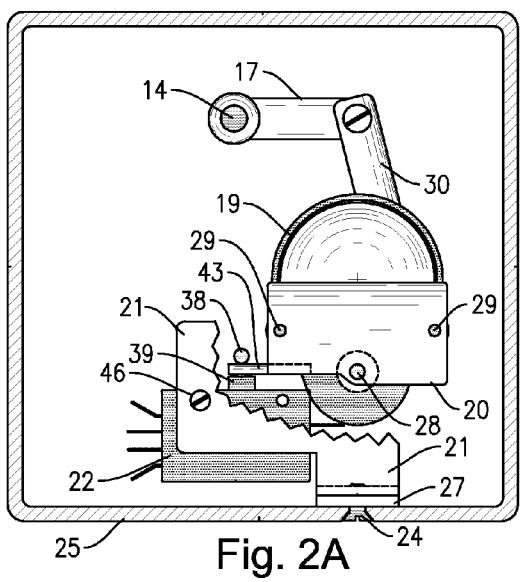
FIG. 2A is a cross section of the bin level indicator of FIG. 1 taken about a line 2-2 according to an embodiment of the present invention.

The range of movement of the motor 19 with respect to the housing 25 is constrained by the actuating arm 43. In FIG. 2A the motor pivot cage 21 is shown in cutaway so as to clearly show the action of the actuating arm 43. The arm 43 is constrained in one direction by a motor pivot stop pin 38 and by a switch actuating button 39 in the other direction. The stop pin 38 is part of the cage 21 and is fixed relative to the housing 25. Movement of the actuating button 39 is opposed by a spring inside a snap acting switch 22. The snap acting switch 22 is mounted to the cage 21 by screws 46 which pass through the cage 21, the switch 22, and into a switch backer plate 23. The switch 22 is also fixed relative to the housing 25.

As shown in FIG. 1, a drive motor crank arm 18 is attached to the output shaft 44 of the rotary motor 19. The crank arm 18 drives a connecting rod 30 in an up and down motion. The connecting rod 30 moves a shaft rocking lever 17 at its distal end in an up and down motion which in turn imparts an oscillating motion to the paddle shaft 14 to which the rocking lever 17 is attached. In various embodiments, various methods might be used to create the oscillating motion of the shaft 14 from the rotary motion of the motor 19, such as a transmission or a cam mechanism. The paddle shaft 14 is journaled to the housing 25 by bearings 31 such as ball bearings or any suitable bearing surface. The shaft 14 extends from the housing 25 and enters the bin. A packing material or seal 32 may be used to prevent material 42 from contaminating the bearings 31.

Figure 2B:
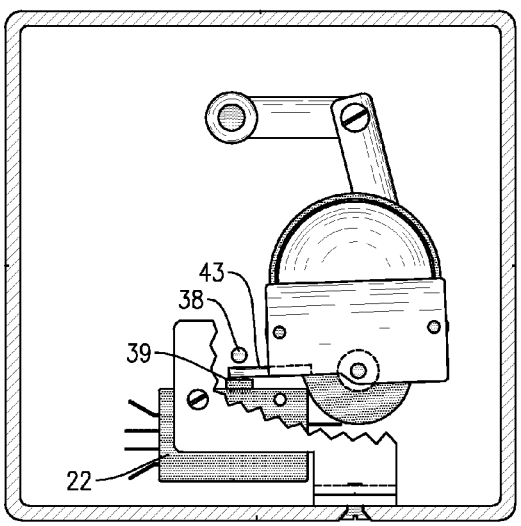
FIG. 2B is the same view as 2A, but illustrates the motor having moved to a second angular position.

In operation, when the paddle 11 is swinging freely without engaging material 42 in the bin, the spring action of the switch button 39 keeps the motor 19 in a fixed position relative to the housing 25 as illustrated in FIG. 2A. If material 42 in the bin rises to the level of the paddle 11 and causes a sufficient resistance to the swinging movement of the paddle 11, a force is created on the motor 19 that is counter to the rotation of the output shaft 44, and the motor 19 will move to a second position as illustrated in FIG. 2B. The switch actuating arm 43 will likewise move with the motor 19 and depress the switch button 39, actuating the switch 22. The switch 22 provides a signal to the user indicating that the level indicator 40 has engaged material 42 in the bin. In various embodiments, various methods may be used to sense a counter-torque developed when the material 42 in the bin contacts the paddle 11, indicating that material 42 is present at the paddle 11.

FIG. 5 illustrates the swinging motion of the paddle 11 as it moves back and forth as viewed from within the bin. FIG. 3 shows a level of material 42 in the bin, which is just touching the paddle 11. In this condition there are no excessive forces acting on the paddle 11 and the paddle shaft 14. FIG. 4 illustrates a level of material 42 in the bin that is far above the location of the level indicator 40. The material 42 is moving downward in mass as it exits the bottom of the bin. The forces exerted on the paddle 11 and shaft 14 may be very great due to the weight of the material 42 above. Under this condition, the flexible section 13 will allow over-travel of the paddle 11. The paddle 11 will be pushed downward with an orientation approximately parallel with the bin wall 41.

Although there are other advantages such as the ability to detect very low density material, it is the unique ability of the paddle 11 to fully engage the material 42 in the bin and at the same time avoid damage from the urging of the material 42 as it moves in the bin, that particularly distinguishes the present invention from the prior art.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A level indicating apparatus adapted to sense a level of a bulk material contained in a structure comprising:
    (a) a housing adapted to be mounted to the structure;
    (b) a paddle shaft supported by bearings in the housing and extending into the structure, the shaft rotating about an axis in an oscillating motion;
    (c) a paddle over-travel mechanism attached to an end of the paddle shaft that is located outside of the housing, the over-travel mechanism providing an over-travel movement that is induced by a movement of the bulk material contained within the structure;
    (d) a paddle connected to the over-travel mechanism, the paddle being oriented along its length at a downward angle from the shaft, the paddle moving in a swinging motion due to the motion of the shaft, the paddle extending into the structure;
    (e) a rotary drive motor mounted within the housing, the motor being operatively coupled to the paddle shaft;
    (f) a switch that changes state when a predetermined value of counter-torque on the shaft is detected, thereby indicating that the bulk material is present at the paddle;
    whereby the paddle is capable of engaging the bulk material and may also move to a substantially vertical downward position by an urging of the bulk material so as to avoid damage to the paddle, over-travel mechanism, and paddle shaft.

2. The apparatus of claim 1 wherein the paddle swings, due to the oscillating motion of the shaft, through an arc of less than 180 degrees from either side of an approximately 6 o'clock position of the paddle, when the bulk material is not present at the paddle.

3. The apparatus of claim 1 wherein the paddle along its length is oriented relative to the axis of the shaft at a downward angle of greater than 0 degrees and less than 90 degrees, when the bulk material is not present at the paddle.

4. The apparatus of claim 1 wherein the paddle along its length is oriented relative to the axis of the shaft at a downward angle of approximately 90 degrees when moved by the urging of the bulk material.

5. The apparatus of claim 1 wherein an active component of the over-travel mechanism is a section of an elastic material having sufficient flexibility to allow the paddle to move undamaged by the urging of the bulk material in the structure, but having sufficient stiffness to transmit the predetermined value of counter-torque generated by a resistance to a movement of the paddle by the bulk material in the structure.

6. The apparatus of claim 5 wherein the active component is a section of wire rope.

7. The apparatus of claim 5 wherein the active component is a section of helical coil.

8. The apparatus of claim 5 wherein the active component is a section of composite material.

9. A level indicating apparatus adapted to sense a level of a bulk material in a structure comprising:
    (a) a housing having a mounting stem extending from the housing, the mounting stem adapted to engage a corresponding gland on a structure wall;
    (b) a paddle shaft rotating in an oscillating motion about an axis and extending into the structure, the axis extending through the mounting stem;

(c) an electric motor located inside the housing and operatively coupled to the paddle shaft;

(d) a paddle over-travel mechanism attached to an end of the paddle shaft that is located outside of the housing, the over-travel mechanism providing an over-travel movement that is induced by a movement of the bulk material contained within the structure;

(e) a paddle connected to the over-travel mechanism, the paddle being oriented along its length at a downward angle from the shaft, the paddle moving in a swinging motion due to the motion of the shaft, the paddle extending into the structure;

(f) a switch that changes state when the bulk material inside the structure contacts the paddle, creating a drag on the paddle, thereby indicating that the bulk material is present at the paddle;

whereby the paddle is capable of engaging the bulk material and may also move to a substantially vertical downward position by an urging of the bulk material so as to avoid damage to the paddle, over-travel mechanism, and paddle shaft.

10. The apparatus of claim 9 wherein the paddle swings, due to the oscillating motion of the shaft, through an arc of less than 180 degrees from either side of an approximately 6 o'clock position of the paddle, when the bulk material is not present at the paddle.

11. The apparatus of claim 9 wherein the paddle along its length is oriented relative to the axis of the shaft at a downward angle of greater than 0 degrees and less than 90 degrees, when the bulk material is not present at the paddle.

12. The apparatus of claim 9 wherein the paddle along its length is oriented relative to the axis of the shaft at a downward angle of approximately 90 degrees when moved by the urging of the bulk material.

13. The apparatus of claim 9 wherein the over-travel mechanism includes a section of an elastic material having sufficient flexibility to allow the paddle to move undamaged by the urging of the bulk material in the structure, but having sufficient stiffness to transmit a predetermined value of counter-torque generated by a resistance to a movement of the paddle by the bulk material in the structure.

14. A monitor adapted to sense a level of a bulk material in a storage bin, comprising:

(a) a housing;

(b) a paddle shaft, extending from the housing into the bin, the shaft operating in an oscillating motion about an axis relative to the housing;

(c) a motor mounted within the housing and operatively coupled to the paddle shaft;

(d) a paddle over-travel mechanism attached to the end of the paddle shaft that is located outside of the housing, the over-travel mechanism providing over-travel movement that is induced by movement of the bulk material contained within the storage bin;

(e) a paddle connected to the over-travel mechanism, the paddle being oriented along its length at a downward angle from the shaft, the paddle moving in a swinging motion due to the oscillating motion of the shaft, the paddle extending into the storage bin;

whereby the paddle will be capable of engaging the bulk material and may also move to an approximately vertical downward position by an urging of the bulk material so as to avoid damage to the paddle, over-travel mechanism, and paddle shaft.

15. The monitor of claim 14 wherein the paddle swings, due to the oscillating motion of the shaft, through an arc of less than 180 degrees from either side of an approximately 6 o'clock position of the paddle, when the bulk material is not present at the paddle.

16. The monitor of claim 14 wherein the paddle along its length is oriented relative to the axis of the shaft at a downward angle of greater than 0 degrees and less than 90 degrees, when the bulk material is not present at the paddle.

17. The monitor of claim 14 wherein the paddle along its length is oriented relative to the axis of the shaft at a downward angle of approximately 90 degrees when moved by the urging of the bulk material as the bulk material moves within the bin.

18. The monitor of claim 14 wherein the over-travel mechanism includes a section of an elastic material having sufficient flexibility to allow the paddle to move undamaged by the urging of the bulk material in the bin, but having sufficient stiffness to transmit a predetermined value of counter-torque generated by a resistance to the movement of the paddle by the bulk material in the bin.

19. The monitor of claim 14 wherein the paddle shaft extends from the housing and into the bin a relatively short distance so as to reduce a negative effect of shear forces acting on the shaft.

\* \* \* \* \*